United States Patent Office 2,724,482
Patented Nov. 22, 1955

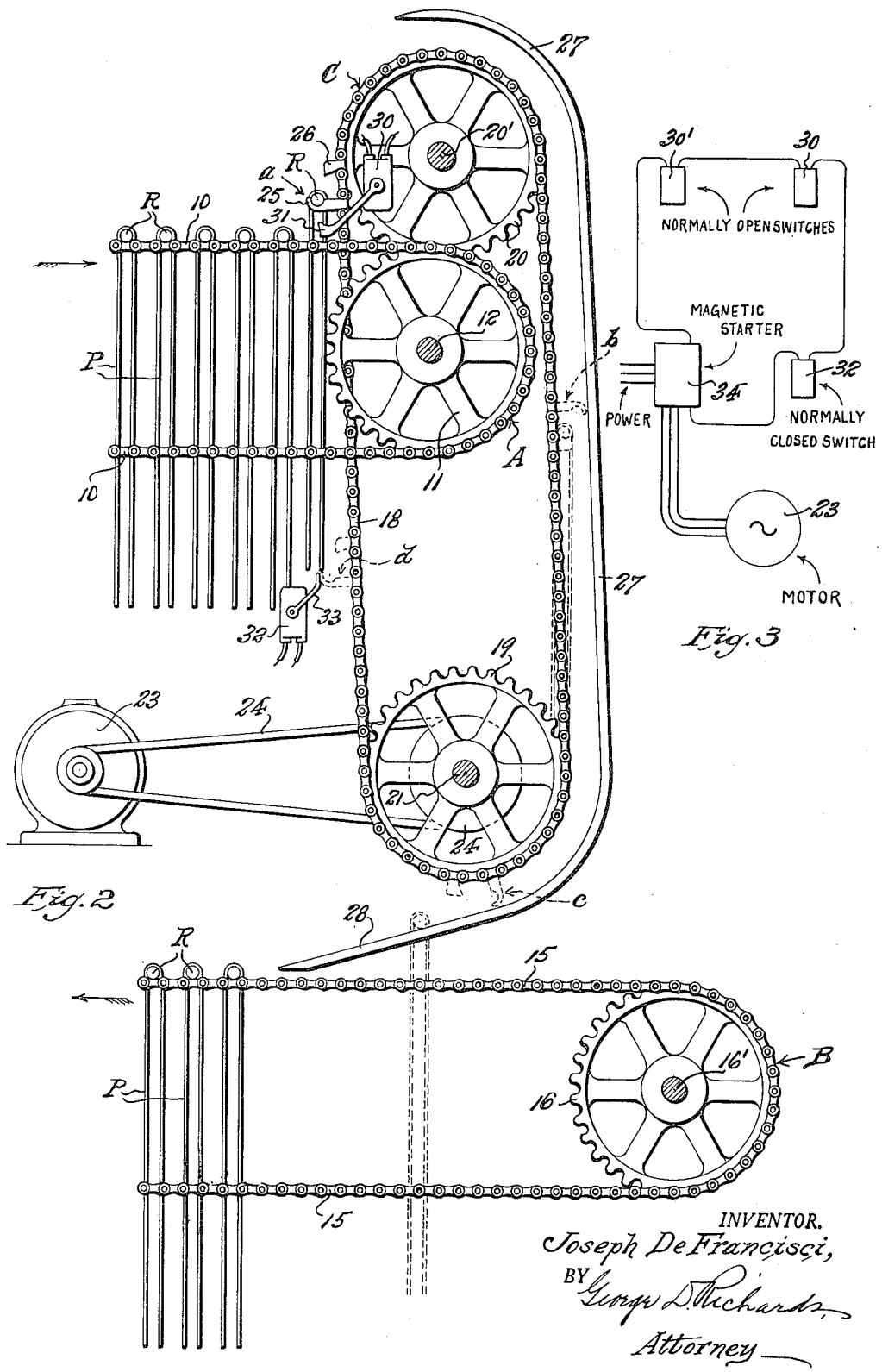

2,724,482

TRANSFER MECHANISM FOR CONTINUOUS DRIER APPARATUS

Joseph De Francisci, Brooklyn, N. Y., assignor to De Francisci Machine Corporation, Brooklyn, N. Y., a corporation of New York Application December 31, 1952, Serial No. 329,041

2 Claims. (Cl. 198—21)

This invention relates to apparatus for drying alimentary paste products, such as macaroni, sphagetti and other long form past products, wherein the product is suspended upon rack rods and, as thus suspended, is continuously moved through drying chamber space by a series of power driven conveyers extending to and fro therein at different levels; means being provided for automatically transferring the loaded rack rods from one conveyer to another; an example of continuous drier of this type being shown in United States Letters Patent No. 2,515,684, dated July 18, 1950.

This invention has for an object to provide an improved means for automatically transferring loaded rack rods from the discharge end of one conveyer to the receiving end of a succeeding conveyer, including novel electrical means for timing and controlling the operation of said transfer means.

The invention has for a further object to provide a transfer means for the stated purpose which is subject to intermittent operation, and under such control that its operation is not initiated until the position of a loaded rack rod to be delivered thereto, if askew on the delivering conveyer, is straightened so that both ends of said loaded rack rod are properly positioned to be operatively engaged by said transfer means.

The above and other objects of this invention will be understood from a reading of the following description of the invention in connection with the accompanying drawings, in which:

Fig. 2 is a fragmentary vertical longitudinal section, taken on line 2—2 in Fig. 1.

Fig. 3 is a wiring diagram of the electrical means by which operation of the transfer means is timed and controlled.

Similar characters of reference are employed in the above described views, to indicate corresponding parts.

Figure 1:
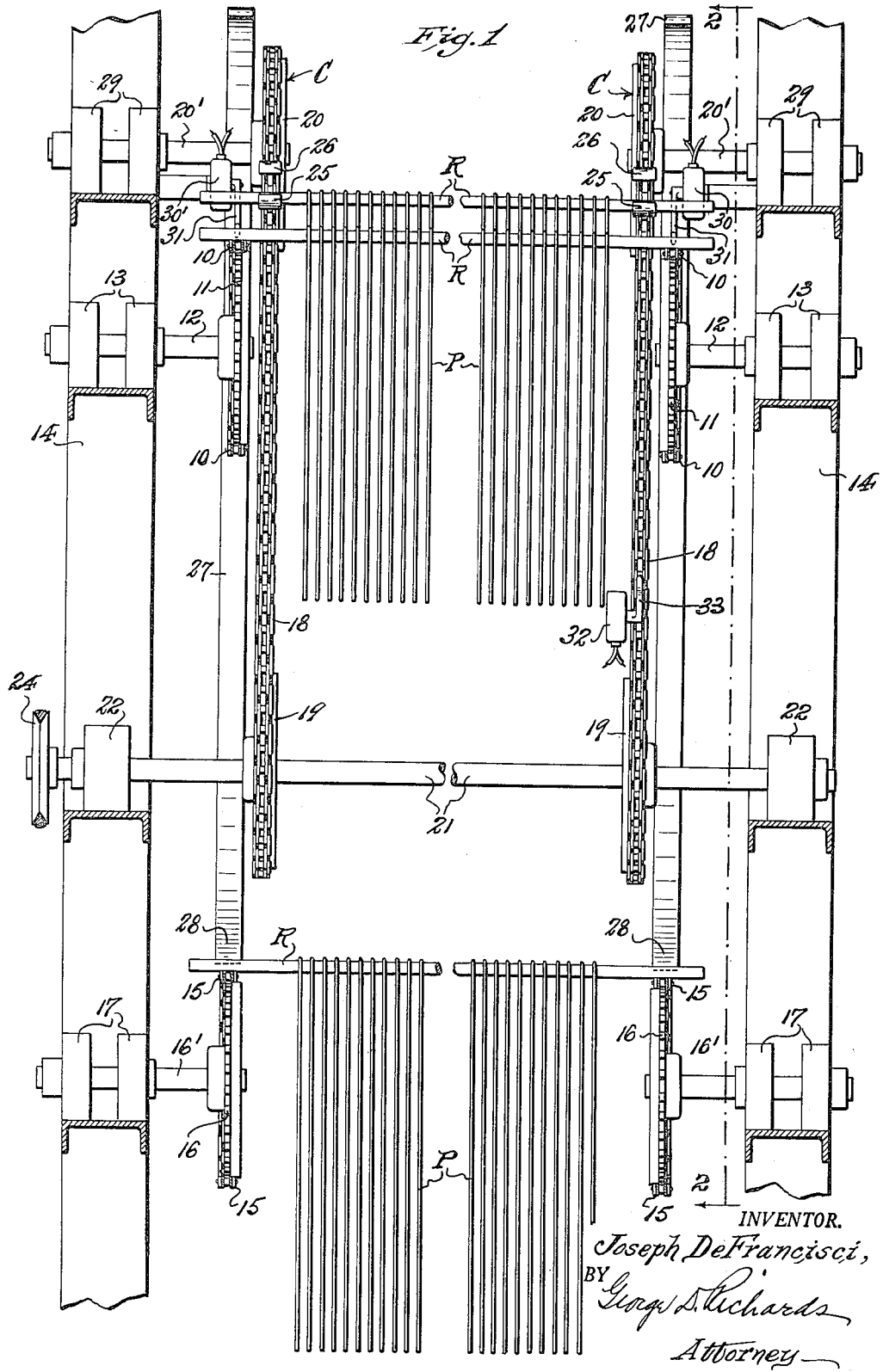
Fig. 1 is a transverse vertical section through upper and lower conveyers of a continuous drier apparatus, showing an intermediate transfer means according to this invention.

In the accompanying drawings is shown the discharge portion of an upper conveyer A which is arranged to move in one direction through the drier interior, and the receiving portion of a lower conveyer B which is arranged to move in the opposite direction through the drier interior. It will be understood that although but two conveyers A and B are shown, with the transfer means according to this invention disposed to extend between the discharge end of conveyer A and the receiving end of conveyer B, such showing is illustrative, and is not intended to preclude use of additional conveyers with cooperating transfer means between respective discharge and receiving ends thereof.

Referring to the drawings, the upper conveyer A comprises a pair of sprocket supported parallel, laterally spaced apart and horizontally disposed endless conveyer chains 10, which respectively border opposite sides of a drier chamber. Said conveyer chains, as already known to the art, are adapted to be simultaneously power driven in any suitable manner. The supporting sprockets include discharge end sprockets 11, which are respectively mounted on respective shafts 12 journaled in bearings 13 carried by framework 14 with which the drier chamber structure is provided. As thus arranged, the pair of conveyer chains 10 are spaced apart so as to provide free space therebetween through which paste strings P, which are loaded upon rack rods R from which they depend, may pass without obstruction or interference. The opposite ends of said rack rods R are respectively supported upon the upper forwardly moving courses of the respective conveyer chains 10.

Similarly, the lower conveyer B likewise comprises a pair of sprocket supported parallel, laterally spaced apart and horizontally disposed power driven endless conveyer chains 15. The supporting sprockets include receiving end sprockets 16, which are respectively mounted on respective shafts 16' journaled in bearings 17 carried by said framework 14. As thus arranged, the pair of conveyer chains 15 are also spaced apart to provide free space therebetween through which rack rod loaded paste strings P carried thereby may pass without obstruction or interference.

Cooperative with the discharge end portions of the conveyer chains 10 of the upper conveyer A is transfer conveyer means C, which is operative to lift paste string loaded rack rods R therefrom, and then convey the same downward for deposit upon the receiving end portions of the oppositely running conveyer chains 15 of the lower conveyer B.

The transfer conveyer C comprises a pair of sprocket supported parallel, laterally spaced apart and substantially vertically disposed endless transfer conveyer chains 18. These transfer conveyer chains are each supported by a lower driving sprocket 19 and an upper idler sprocket 20. The lower driving sprockets 19 are positioned above the receiving end portion of the lower conveyer B, so as to upwardly space the discharge end of said transfer conveyer C above and relative to the level of the upper carrying courses of the chains 15 of said lower conveyer B. The upper idler sprockets 20 are positioned above the discharge end of the upper conveyer A, and in such relation to the sprocket supported terminal thereof that rising courses of the transfer conveyer chains 18 (which chains run in clockwise direction) lap the upper carrying courses of the chains 10 of said upper conveyer A, while descending courses of said transfer conveyer chains 18 are outwardly offset beyond said terminals of said upper conveyer A. Preferably, the relative disposition of the driving sprockets 19 and idler sprockets 20 is such as to somewhat incline the transfer chains 18, or at least descending courses thereof, downwardly and outwardly from their upper receiving end portions toward their lower discharge end portions. Said idler sprockets 20 are respectively mounted on respective shafts 20' journaled in bearing 29 carried by the framework 14.

The lower driving sprockets 19 of the transfer conveyer chains 18 are mounted on a transverse drive shaft 21, which is journaled in and between bearings 22 carried by the framework 14. Said drive shaft is driven from an electric motor 23 by means of interconnecting belt and pulley or equivalent transmission 24.

Fixed on each transfer conveyer chain 18, to project outwardly therefrom, is a pick-up hook member 25, and also fixed on each transfer conveyer chain 18, to likewise project outwardly therefrom, beyond but adjacently spaced relative to the pick-up hook member 25, is a rack rod supporting stop lug 26.

Suitably supported outwardly of and adjacent to the descending course of each transfer conveyer chain 18 is a perpendicular guard rail 27. These guard rails respectively extend from the upper to the lower end of the transfer conveyer means C. Each guard rail 27 terminates at its lower end in a forwardly extending, downwardly inclined chute section 28. Said chute sections 28 pass beneath the discharge end of the transfer conveyer means C, and respectively overhang the receiving end portions of the respective upper carrying courses of the conveyer chains 15 of the lower conveyer B, whereby to cause loaded rack rods R, which are transferred from the upper conveyer A by the transfer conveyer means C, to slide down said chute sections onto said upper carrying courses of the conveyer chains 15 of the lower conveyer B, as said rack rods are discharged from the transfer conveyer means C in the manner hereinafter more particularly described.

The loaded rack rod conveyers A and B are driven at slow speed, whereby to give required time for accomplishing the drying of paste strings P carried thereby, as the latter continuously progress through the drying chambers in which said conveyers run. The transfer conveyer means C is adapted to be intermittently operated at relatively high speed, whereby to successively pick up and transfer the loaded rack rods from the upper conveyer A to the lower conveyer B.

The means for controlling and timing the operation of the transfer conveyer means C in cooperation with the loaded rack rod conveyers A and B comprises the following electrical agencies:

Respectively mounted above and adjacent to the discharge end portions of the upper carrying courses of the respective conveyer chains 10 of the upper conveyer A, are respective normally open self-opening starting switches 30 and 30', each having a switch actuating member or trigger 31 which respectively overhangs the upper carrying course of said conveyer chains 10, so as to be respectively opposed to respective projecting end portions of loaded rack rods R as advanced by said conveyer chains. Suitably supported adjacent to the rising course of one of the transfer conveyer chains 18 is a normally closed self-closing stop switch 32. This stop switch 32 is provided with a switch actuating member or trigger 33 which projects into the path of movement of the pick-up hook member 25 carried by said adjacent transfer conveyer chain, subject to engagement by said pick-up hook member.

Said starting switches 30 and 30' and the stop switch 32 are connected in series in circuit with a magnetic starter 34 (see Fig. 3), which controls the operation of the motor 23 by which the transfer conveyer means C is operated.

In the drier operation, the rack rods R, carrying the paste strings P to be dried, are successively deposited upon the upper conveyer A, so as to bridge across the forwardly moving upper carrying courses of the conveyer chains 10 thereof. The loaded rack rods are slowly advanced by said upper conveyer A toward the transfer conveyer means C. As a loaded rack rod approaches the transfer conveyer means C, so that its opposite end portions can move into the path of upward movement of the respective pick-up hook members 25 on the transfer conveyer chains 18, said opposite end portions of the rack rod, if said rack rod is properly parallel to the receiving face of the transfer conveyer means C, will strike and trip the respective triggers 31 of both normally open starting switches 30 and 30' to close the latter, and thereby close the circuit, through the normally closed stop switch 32, so that the magnetic starter 34 is energized and operated to start the motor 23 whereby to actuate the transfer conveyer means C.

It may sometimes happen that a loaded rack rod, approaching the transfer conveyer means, will lie askew across the upper conveyer A, so that one end portion of the rack rod will move into the path of movement of the pick-up hook member 25 of one transfer conveyer chain 18, and, as so disposed, will trip a trigger member 31 to close one of the starting switches, but the opposite end portion of said rack rod fails to enter across the path of movement of the pick-up hook member 25 of the other transfer conveyer chain 18, and consequently will fail to reach and trip the trigger of the other starting switch, which therefore remains open, and consequently the magnetic starter 34 will not be energized to start motor 23 for transfer conveyer means operation. Should the motor 23 be started and thereby the transfer conveyer means operated while a rack rod lies askew, one end of the latter might fail to be engaged and lifted. This would be very objectionable since said loaded rack rod would be then tilted endwise and its load of paste strings displaced, with risk of destruction and loss, and also with risk of obstructing the smooth continuous operation of the drier. It will therefore be understood that unless both said normally open starting switches 30 and 30' are closed by a loaded rack rod, which is disposed in straight parallel relation to the receiving face of the transfer conveyer means C, the motor 23 will not be started, and the transfer conveyer means will not be operated.

If a loaded rack rod approaching the transfer conveyer means C happens to be askew, operative engagement of one end portion thereof with one of the starting switches will arrest further advance of such end portion until the opposite end portion thereof, under impulsion of the moving conveyer chain 10 engaged thereby, advances said opposite end portion so as to straighten the disposition of the rack rod, and thus allow said opposite end portion thereof to reach and close the other starting switch, whereby both starting switches are then temporarily closed to effect starting of the motor 23, and consequent operation of the transfer conveyer means C.

The transfer conveyer means C having been started by engagement of a loaded rack rod with both starting switches 30 and 30', the rising courses of the transfer conveyer chains 18 will carry upward their pick-up hook members 25 into engagement with opposite end portions of said loaded rack rod, and then, by their continued upward movement, lift said loaded rack rod upwardly and away from the upper conveyer A (as indicated at position a in Fig. 2). The continuing movement of the transfer conveyer chains 18 carries the picked up loaded rack rod over the top of the transfer conveyer means, and then downwardly as said chains enter upon their descending courses. As the loaded rack rod starts upon its descending movement it slides forward, under gravity, away from the pick-up hook members 25 so as to be caught and supported by the stop lugs 26 while moving through the descending course of the transfer conveyer means (see position b indicated by broken lines in Fig. 2).

As the transfer conveyer chains 18 complete their descending courses and move around the lower sprockets 19, the stop lugs 26 are inverted so that the loaded rack rod drops away therefrom onto the chute sections 28 of the guard rails 27 (see position c indicated by broken lines in Fig. 2). The thus discharged loaded rack rod slides down over said chute sections 28, to pass thence onto the lower transfer conveyer B, whereby to be carried on by the latter. In the meantime, the stop lugs 26 and the pick-up hook members 25 are carried upward by the ascending courses of the transfer conveyer chains 18, until a pick-up hook member makes passing engagement with the trigger 33 of the normally closed stop switch 32 (see position d indicated by broken lines in Fig. 2), thus temporarily opening said switch, and thereby interrupting the magnetic starter circuit, so that the magnetic starter is conditioned to stop the motor 23 and thus the transfer conveyer means C to complete the cycle of operative movement of the latter, with the pick-up hook members 25 poised in an initial position beneath the plane of the loaded rack rods carried by the upper conveyer means A.

The above described operation of the transfer conveyer means C is thereafter successively repeated, as succeeding loaded rack rods are carried into closing engagement with the starting switches by which each transfer operation is initiated. The speed of operation of the transfer conveyer means is so rapid in relation to the extremely slow speed movement of the upper conveyer means A, that each cycle of operation of the transfer conveyer means C can be completed by the time a succeeding loaded rack rod is ready to be picked up and closes the starting switches 30 and 30'.

It will be obvious that the instant invention provides a very simple and yet highly efficient means in combination with continuously operated drier conveyers, whereby to automatically transfer loaded rack rods from one level to another in which a succession of said drier conveyers run, and in such manner that risk of displacement of the rack rods from level paste string carrying position is eliminated, and smooth continuous progress of said loaded rack rods through the drying chambers is assured.

Having now described my invention, I claim:

1. In a continuous drier apparatus of the type providing drying chamber space through which rack rods, from which the product to be dried is suspended, are continuously and successively moved by a series of driven longitudinal conveyers vertically spaced apart at different levels, comprising an upper horizontal conveyer, and a lower horizontal conveyer, each said conveyer comprising laterally spaced endless conveyer chains adapted to be bridged by the loaded rack rods, a substantially vertical transfer conveyer for successively transferring the loaded rack rods from the discharge end of said upper horizontal conveyer to the receiving end of the lower horizontal conveyer, said transfer conveyer also comprising laterally spaced, sprocket supported endless conveyer chains, rising courses of said transfer conveyer chains being disposed to intersect the path of advancing movement of the loaded rack rods carried by said upper horizontal conveyer at a point adjacent the discharge end thereof, the descending courses of said transfer conveyer chains being outwardly offset in by-passing relation to the discharge end of said upper horizontal conveyer, the lower discharge end of said transfer conveyer being adjacently spaced above the receiving end portion of the lower horizontal conveyer, a chute means to receive loaded rack rods discharged from said transfer conveyer, down which the same slide for deposit upon the receiving end of the lower horizontal conveyer, means carried by the transfer conveyer chains adapted to engage and lift a loaded rack rod away from the upper horizontal conveyer and then convey the same for discharge to said chute means and thence to the lower horizontal conveyer, an electric motor for driving the transfer conveyer, and electrical means for starting and stopping said motor whereby to effect timed cyclic operation of the transfer conveyer, said electrical means comprising a pair of self-opening normally open starting switches respectively adjacent the respective advancing courses of the conveyer chains of the upper horizontal conveyer, each said starting switch being provided with switch closing means respectively engageable by opposite end portions of a loaded rack rod which is moved by the upper horizontal conveyer to a position for transfer, a self-opening normally closed stop switch having actuating means adapted to be engaged by rack rod supporting means of the transfer conveyer as the latter completes its operating cycle, thereby to temporarily open said stop switch and a magnetic motor starter controlled by said switches, said starting and stop switches being connected in series with said magnetic motor starter.

2. In a continuous drier apparatus of the type providing drying chamber space through which rack rods, from which the product to be dried is suspended, are continuously and succesively moved by a series of driven longitudinal conveyers spaced apart at different levels and comprising an upper horizontal conveyer, a lower horizontal conveyer, each conveyer comprising laterally spaced endless conveyer chains adapted to be bridged by the loaded rack rods, and a substantially vertical transfer conveyer means for successively transferring the loaded rack rods from the discharge end portion of the upper horizontal conveyer to the receiving end portion of the lower horizontal conveyer, said transfer means also comprising laterally spaced sprocket supported endless transfer conveyer chains adapted to be bridged by the loaded rack rods and being disposed so that rising courses thereof intersect the path of advancing movement of the loaded rack rods carried by said upper horizontal conveyer at a point adjacent the discharge end thereof, the descending courses of said transfer conveyer chains being outwardly offset in by-passing relation to the discharge end of said upper horizontal conveyer, the lower discharge end of the transfer conveyer means being spaced adjacently above the receiving end portion of the lower conveyer, a chute means to receive loaded rack rods discharged from the transfer conveyer means, down which chute the loaded rack rods slide for deposit upon the receiving end portion of the lower horizontal conveyer, each transfer conveyer chain having pick-up hook members spaced therealong to project outwardly therefrom, said pick-up hook members, moved by rising courses of said transfer conveyer chains, being adapted to respectively engage opposite end portions of a loaded rack rod to be transferred, whereby to lift and carry said load rack rod away from the upper horizontal conveyer, each transfer conveyer chain also having stop lugs spaced beyond but adjacent to said pickup hook members, whereby to receive and support the loaded rack rods on the descending courses of the transfer conveyer chains, and to discharge said loaded rack rods to said chute means at the lower end of the transfer conveyer means, an electric motor for driving the transfer conveyer means, a magnetic motor control means for starting and stopping said motor, a pair of self-opening normally open starting switches each provided with switch closing means respectively engageable by opposite end portions of a loaded rack rod which is moved by the upper horizontal conveyer in normal position for transfer, whereby to energize the magnetic motor control means to start the motor, a self-closing normally closed stop switch having switch opening means adapted to be engaged by a pick-up hook member of the transfer conveyer chain as the transfer conveyer means completes an operating cycle, whereby to deenergize the magnetic motor control means to stop the motor, and said starting and stop switches being connected in series with said magnetic motor control means.

References Cited in the file of this patent

UNITED STATES PATENTS

| | | |
|---|---|---|
| 1,053,391 | Hilke | Feb. 18, 1913 |
| 1,582,457 | Ford | Apr. 27, 1926 |
| 2,138,813 | Bemis | Dec. 6, 1938 |
| 2,606,644 | Saborsky | Aug. 12, 1952 |